(12) United States Patent
Akiyama et al.

(10) Patent No.: US 8,582,981 B2
(45) Date of Patent: Nov. 12, 2013

(54) OPTICAL TRANSMITTER AND CONTROL METHOD THEREFOR

(75) Inventors: Yuichi Akiyama, Kawasaki (JP);
Hideyuki Miyata, Kawasaki (JP);
Toshiki Tanaka, Kawasaki (JP); Masato Nishihara, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 986 days.

(21) Appl. No.: 12/013,857

(22) Filed: Jan. 14, 2008

(65) Prior Publication Data
US 2008/0187324 A1 Aug. 7, 2008

(30) Foreign Application Priority Data
Jan. 15, 2007 (JP) .................................. 2007-006349

(51) Int. Cl.
*H04B 10/00* (2013.01)
(52) U.S. Cl.
USPC ........................................... 398/188; 398/195
(58) Field of Classification Search
USPC .................................................. 398/188, 195
See application file for complete search history.

(56) References Cited

U.S. PATENT DOCUMENTS

| 5,170,274 | A | 12/1992 | Kuwata et al. | |
|---|---|---|---|---|
| 7,116,460 | B2 | 10/2006 | Griffin | |
| 2006/0263098 | A1* | 11/2006 | Akiyama et al. | 398/188 |
| 2007/0065161 | A1 | 3/2007 | Miura et al. | |
| 2007/0122161 | A1* | 5/2007 | Charlet et al. | 398/188 |
| 2007/0177882 | A1* | 8/2007 | Akiyama | 398/185 |
| 2010/0098435 | A1* | 4/2010 | Akiyama | 398/188 |

FOREIGN PATENT DOCUMENTS

| JP | 03-251815 | 11/1991 |
|---|---|---|
| JP | 2007-82094 | 3/2007 |

* cited by examiner

*Primary Examiner* — Nathan Curs
(74) *Attorney, Agent, or Firm* — Staas & Halsey LLP

(57) ABSTRACT

The disclosed optical transmitter and control method include performing phase modulation of a light propagating through a corresponding optical path in accordance with a data signal, supplying bias voltages for regulating an operating point of each of phase modulation performed, imparting a predetermined phase difference, supplying bias voltages for phase difference regulation and coupling lights output from the corresponding optical paths. The optical transmitter includes superimposing a pilot signal on either one of bias voltages where the pilot signal has a frequency lower than a frequency of a bit rate of the data signal, and performing a feedback control in accordance with a result of monitoring.

13 Claims, 15 Drawing Sheets

OPTICAL TRANSMITTER AND CONTROL METHOD THEREFOR

CROSS-REFERENCE TO RELATED APPLICATIONS

This application is related to and claims the benefit of priority from Japanese Patent Application No. 2007-006349, filed on Jan. 15, 2007, the entire contents of which are incorporated herein by reference.

BACKGROUND

1. Field

The present invention relates to an optical transmitter and a control method therefor for adaptation to an optical transmission system. More specifically, the invention relates to control of an optical transmitter that generates and transmits a multiphase modulated signal.

2. Description of the Related Art

Research and studies for employing various types of modulation schemes for enhancing the capacity of transmission distance of optical transmission systems are popular. Modulation schemes under present research and studies include various types of modulation schemes, in addition to systems typically adapted to products, such as NRZ (non-return to zero) modulation schemes and RZ (return to zero) modulation schemes, for example, intensity modulation schemes, such as the CSRZ (carrier-suppressed return to zero) modulation scheme and the optical duobinary modulation scheme; and multiphase modulation schemes such as DPSK (differential phase shift keying) modulation schemes and DQPSK (differential quadrature phase shift keying) modulation schemes. Further, research and development are underway for optical transmission systems using these modulation schemes.

In such an optical transmission system, stabilizing techniques for stabilizing optical transmission signals are essential for components of an optical transmitter. Among such stabilizing techniques, there is, for example, an ABC (automatic bias circuit) that prevents a transmission signal from being deteriorated due to drift of a bias voltage of an LN modulator of a practical system using the NRZ modulation scheme operating with land or submarine communication.

SUMMARY

The disclosed apparatus includes a light source generating an optical light, a splitter splitting the light received from the light source into a plurality of lights (light portions), a plurality of optical paths each, inputting a respective light split by the splitter, a plurality of phase modulator portions each performing phase modulation of a respective light propagating through a corresponding optical path in accordance with a data signal; a first bias supply portion supplying bias voltages for regulating an operating point of each of the plurality of phase modulator portions.

The disclose apparatus includes phase shifter portions each imparting a predetermined phase difference into the respective light propagating through the corresponding optical paths, a second bias supply portion, supplying bias voltages for phase difference regulation to a side of the phase shifter portions, a coupler, coupling the lights output from the corresponding optical paths, a pilot signal superimposition portion superimposing a pilot signal on either one of bias voltages being supplied to a side of at least one of the plurality of phase modulator portions and to the side the phase shifter portions, the pilot signal having a frequency lower than a frequency of a bit rate of the data signal, a monitor portion monitoring an output of the coupler; and a bias control portion performing a feedback control of the first bias supply portion and second bias supply portion in accordance with a result of monitoring performed by the monitor portion.

Additional aspects and/or advantages will be set forth in part in the description which follows and, in part, will be apparent from the description, or may be learned by practice of the invention.

BRIEF DESCRIPTION OF THE DRAWINGS

These and/or other aspects and advantages will become apparent and more readily appreciated from the following description of the embodiments, taken in conjunction with the accompanying drawings of which.

DETAILED DESCRIPTION OF THE PREFERRED EMBODIMENTS

Figure 1:
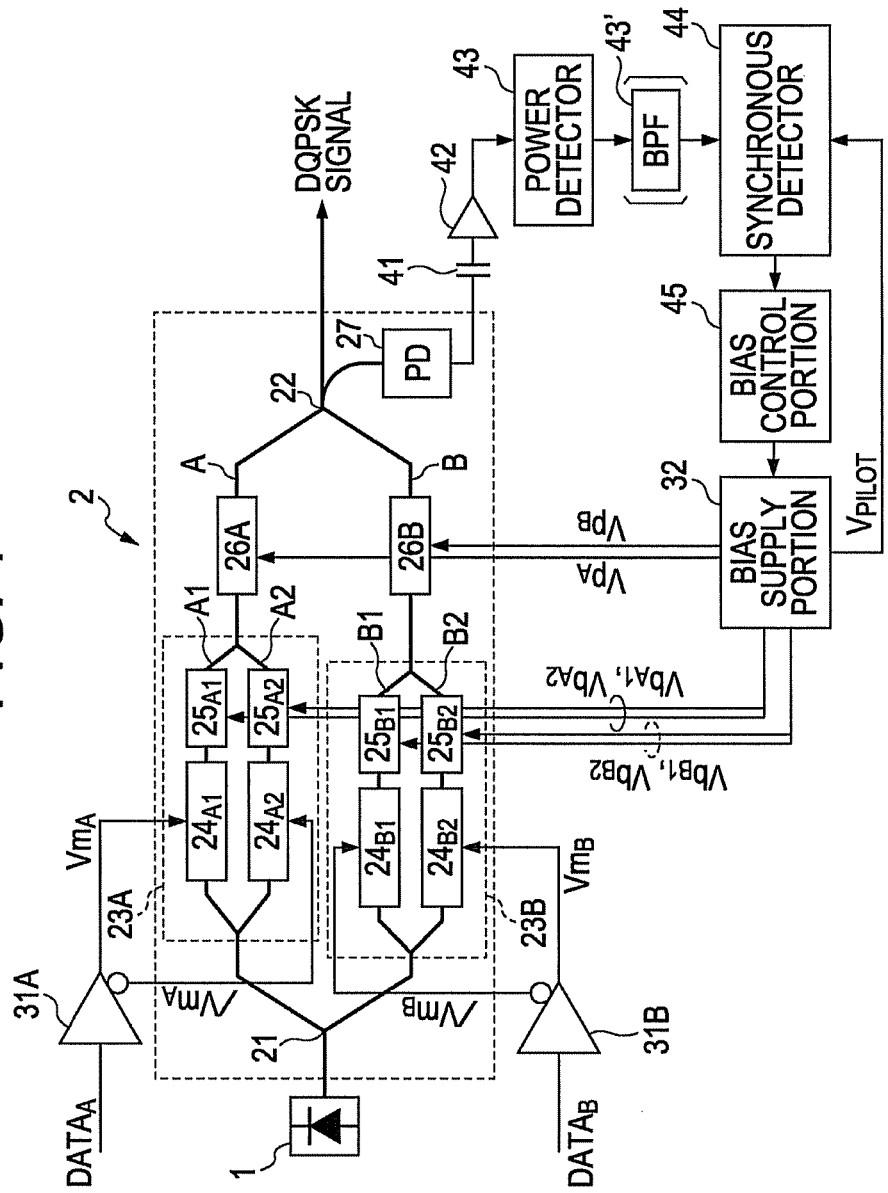
FIG. 1 is a block diagram illustrating one example of a configuration of an optical transmitter.

Reference will now be made in detail to the embodiments, examples of which are illustrated in the accompanying drawings, wherein like reference numerals refer to the like elements throughout. The embodiments are described below to explain the present invention by referring to the figures.

FIG. 1 is a block diagram showing an example of a configuration of an optical transmitter in accordance with an embodiment.

With reference to FIG. 1, the optical transmitter supplies, for example, a DQPSK modulator 2 with an output light produced from a light source 1, and thereby generates and transmits DQPSK modulated signal (or, referred to "DQPSK signal", hereinbelow). The light source 1 is, for example, a semiconductor laser, and generates a continuous wave (CW) laser light. As a wavelength of the CW laser light, a general wavelength of, for example, about 1550 nm, which is generally used for optical communication, is used.

The DQPSK modulator 2 generates the DQPSK signal by phase modulating the CW laser light, which has been supplied from the light source 1, in accordance with data signals $DATA_A$ and $DATA_B$. More specifically, the DQPSK modulator 2 may use a Mach-Zehnder interferometer. The interferometer may include a splitter 21 provided as a splitter portion for splitting the input CW laser light into two; a first arm A to which a portion of the light split by the splitter 21 is propagated and a second arm B to which another portion light is propagated; and an optical coupler 22 (provided as an optical coupler portion) for coupling together respective lights propagated through the first and second arms A and B. The first and second arms A and B, respectively, have phase modulator portions 23A and 23B and phase shifter portions 26A and 26B.

In the phase modulator portion 23A, respective arms A1 and A2 of the Mach-Zehnder interferometer have modulation electrodes $24_{A1}$ and $24_{A2}$ and bias electrodes $25_{A1}$ and $25_{A2}$. A driving signal $Vm_A$ and an inversion driving signal $/Vm_A$ corresponding to the data signal $DATA_A$ are, respectively, applied to the modulation electrodes $24_{A1}$ and $24_{A2}$. Bias voltages $Vb_{A1}$ and $Vb_{A2}$ to which a low-frequency pilot signal $V_{PILOT}$ is superposed are, respectively, applied to the bias electrodes $25_{A1}$ and $25_{A2}$. In the phase modulator portion 23B, respective arms B1 and B2 of the Mach-Zehnder interferometer have modulation electrodes $24_{B1}$ and $24_{B2}$ and bias electrodes $25_{B1}$ and $25_{B2}$. A driving signal $Vm_B$ and an inversion driving signal $/Vm_B$ corresponding to the data signal $DATA_B$ are, respectively, applied to the modulation electrodes $24_{B1}$ and $24_{B2}$. Bias voltages $Vb_{B1}$ and $Vb_{B2}$ to which the low-frequency pilot signal $V_{PILOT}$ is superposed are, respectively, applied to the bias electrodes $25_{B1}$ and $25_{B2}$.

The respective driving signals $Vm_A$ and $Vm_B$ are generated by modulation drive portions 31A and 31B, and the respective inversion driving signals $/Vm_A$ and $/Vm_B$ are generated by modulation drive portions 31A and 31B. The respective bias voltages $Vb_{A1}$ to $Vb_{B2}$ are generated by a bias supply portion 32. The low-frequency pilot signal $V_{PILOT}$ has a frequency sufficiently lower than a frequency corresponding to a bit rate of the data signals $DATA_A$, $DATA_B$. Further, an amplitude of the low-frequency pilot signal $V_{PILOT}$ is restrained to a level that does not substantially influence transmission characteristics of the DQPSK signal. In the present example, the bias supply portion 32 includes first and second bias supply portions and a function serving as a low-frequency pilot signal superimposition portion.

The present example has thus been presented considering that the low-frequency pilot signal $V_{PILOT}$ is superimposed on the respective bias voltages $Vb_{A1}$ and $Vb_{A2}$. Alternatively, however, the low-frequency pilot signal $V_{PILOT}$ may be superimposed on the respective bias voltages $Vb_{B1}$ and $Vb_{B2}$. Still alternatively, the low-frequency pilot signal $V_{PILOT}$ may be superimposed on only one of the respective bias voltages $Vb_{A1}$ and $Vb_{A2}$.

The respective phase shifter portions 26A, 26B impart a relative phase difference of $n\pi/2$ (where n represents an arbitrary odd number) into the light propagating through the respective arm A, B. More specifically, in the present example, it is contemplated that n=1, and the $\pi/2$ relative phase difference is imparted to the light propagated through the respective arm A, B. A specific example of amounts of phase shift in the respective phase shifter portions 26A and 26B is provided herein. For example, a phase variation of $\pi/4$ may be implemented in one of the phase shifter portions 26A and 26B, a phase variation of $-\pi/4$ may be caused in the other one of the phase shifter portions 26A and 26B, and the two values may be summed together. Thereby, the $\pi/2$ relative phase difference can be accomplished. Further, in the example, it is further contemplated that amounts of phase shift in the phase shifter portions 26A and 26B can be regulated corresponding to bias voltages $Vp_A$ and $Vp_B$ applied to the phase shifter portions 26A and 26B, respectively. The bias voltages $Vp_A$, $Vp_B$ are caused in the bias supply portion 32. However, in the present embodiment, different from the typically or previously proposed technique described above, the low-frequency pilot signal $V_{PILOT}$ is not applied to the respective bias voltages $Vp_A$, $Vp_B$.

The present embodiment has been described above with reference to the example in which both light portions propagating through the respective arms A and B are caused to have phase variations and thereby have the $\pi/2$ relative phase difference. Alternatively, however, the $\pi/2$ relative phase difference can be accomplished even by causing the light propagating through only one of the arms A and B to have the phase variation. Nevertheless, however, in the case an output voltage reduction of the bias supply portion 32 is taken into consideration, it is preferable that the phases of both lights propagating through the respective arms A and B are varied. The present embodiment has been described above with reference to the example configuration including the phase shifter portions 26A and 26B respectively disposed at output stages of the phase modulator portions 23A and 23B. Alternatively, however, the configuration may be such that the phase shifter portions 26A and 26B, respectively, are disposed at input stages, and more specifically, portions between the splitter 21 and the respective phase modulator portions 23A and 23B.

The respective lights, to which the $\pi/2$ relative phase difference has been imparted by the phase shifter portions 26A and 26B, are input into the optical coupler 22 utilizing, for example, a multi-mode interference (MMI) (optical couplers hereinbelow will each be referred to as an "MMI coupler"). The MMI coupler 22 includes two output ports confirmation corresponding to the arms A and B, and operates in the following manner. After having generated a DQPSK signal by coupling together optical signals supplied to the respective input ports from the respective phase shifter portions 26A and 26B, the MMI coupler 22 splits the DQPSK signal into two signals at a predetermined ratio. The MMI coupler 22 then transmits one of the signals as an output of the optical transmitter to the outside, and the other signal as a monitor light to a photodetector (PD) 27.

The photodetector 27 converts the monitor light, which has been received from the MMI coupler 22, into an electric signal, and outputs the electric signal to be used as a monitor signal. In addition, a monitor signal into the photodetector 27 may be either an in-phase signal or a reverse phase signal. The photodetector 27 may be built-in in the DQPSK modulator 2. The monitor signal output from the photodetector 27 is input into a power detector 43 via an AC-coupling capacitor 41 and an amplifier 42. Then, an output signal from the power detector 43 is input into a band pass filter (BPF) 43'. The BPF 43' extracts a frequency component included in the monitor signal and corresponding to the low-frequency pilot signal $V_{PILOT}$, and outputs the component to a synchronous detector 44. Depending on the configuration, however, the BPF 43' is omissible. Using the low-frequency pilot signal $V_{PILOT}$, which has been output from the bias supply portion 32, the synchronous detector 44 uses a synchronous detection scheme to perform a synchronous detection of the monitor signal being output from the BPF 43', and then outputs a signal indicative of a result to a bias control portion 45. In the present example, the photodetector 27, the capacitor 41, the amplifier 42, the power detector 43, the BPF 43' and the synchronous detector 44 function as a monitor portion.

In response to the output signal of the synchronous detector 44, the bias control portion 45 performs a feedback control of the bias voltages $Vp_A$ and $Vp_B$ that are fed to the respective phase shifter portions 26A and 26B from the bias supply portion 32. The feedback control is thus performed so that a relative phase difference to be imparted from the respective phase shifter portions 26A and 26B to the lights propagating through the respective arms A and B is stabilized at an optimal value ($\pi/2$, in the present example case). Further, in response to the output signal of the synchronous detector 44, the bias control portion 45 performs feedback control of the bias voltages $Vb_{A1}$ to $Vb_{B2}$ that are fed to the respective bias electrodes $25_{A1}$ to $25_{B2}$ from the bias supply portion 32. The feedback control is thus performed so that operating points of the respective phase modulator portions 23A and 23B are optimized.

Operation of an embodiment will be described hereinbelow. The optical transmitter, which has the configuration described above, operates in a manner described hereinbelow.

Output light from the light source 1 is split into two lights (light portions) by the splitter 21, and the lights are, respectively, transferred to the first and second arms A and B. The light propagating through the arm A is phase modulated in accordance with the data signal $DATA_A$ by the phase modulator portion 23A. In this case, in the phase modulator portion 23A, the driving signal $Vm_A$ and inversion driving signal $/Vm_A$ have been respectively applied to the modulation electrodes $24_{A1}$ and $24_{A2}$, and concurrently, the bias voltages $Vb_{A1}$ and $Vb_{A2}$, which include the superimposed low-frequency pilot signal $V_{PILOT}$, have been applied to the respective bias electrodes $25_{A1}$ and $25_{A2}$. Similarly, the light propagating through the arm B is phase modulated in accordance with the data signal $DATA_B$ by the phase modulator portion 23B. In this case, in the phase modulator portion 23B, the driving signal $Vm_B$ and inversion driving signal $/Vm_B$ have been respectively applied to the modulation electrodes $24_{B1}$ and $24_{B2}$, and concurrently, the bias voltages $Vb_{B1}$ and $Vb_{B2}$ have been applied to the respective bias electrodes $25_{B1}$ and $25_{B2}$. The lights having thus been phase modulated by the phase modulator portions 23A and 23B are, respectively, imparted the relative $\pi/2$ phase difference the phase shifter portions 26A and 26B to which the bias voltages $Vp_A$ and $Vp_B$, on which the superimposed low-frequency pilot signal $V_{PILOT}$ is not superimposed have been applied. Then, the respective lights are coupled together and the k is not superimposed on which the low-frequency pilot signal, whereby a DQPSK signal is generated.

The DQPSK signal is transmitted as an output light of the optical transmitter from one output port of the MMI coupler 22. Concurrently, a part of the DQPSK signal is output as a monitor light from the other output port of the MMI coupler 22, and is converted by the photodetector 27 into an electric signal (monitor signal). Only an alternating-current (AC) component of the monitor signal, which has been output from the photodetector 27, is extracted by the capacitor 41, and is then amplified by the amplifier 42 to a predetermined level. Further, a frequency component (optical component) of the monitor signal corresponding to the low-frequency pilot signal $V_{PILOT}$ is extracted by the BPF 43' after an output power of the amplifier 42 is detected by the power detector 43. The optical component extracted by the BPF 43' is input into the synchronous detector 44. In the synchronous detector 44, a synchronous detection using the low-frequency pilot signal $V_{PILOT}$ is performed, and the result is transferred to the bias control portion 45.

The following paragraphs describe a principle according to which a bias voltage control in a phase shifter portion is enabled in accordance with a result of the synchronous detection using the low-frequency pilot signal $V_{PILOT}$.

As described above, in the configuration of the optical transmitter, when a bias voltage control in a phase shifter portion is performed, the low-frequency pilot signal $V_{PILOT}$ that vary the relative phase difference between the lights propagating through the respective arms A and B is superimposed on the bias voltages $Vb_{A1}$ and $Vb_{A2}$ on the side of the arm A. Accordingly, the relative phase difference between the lights propagating through the respective arms A and B is varied in $\pi/2 \pm \Phi$ by a variation in the bias voltage on the side of the arm A, the variation corresponding to a variation in the amplitude of the low-frequency pilot signal $V_{PILOT}$.

Figure 2:
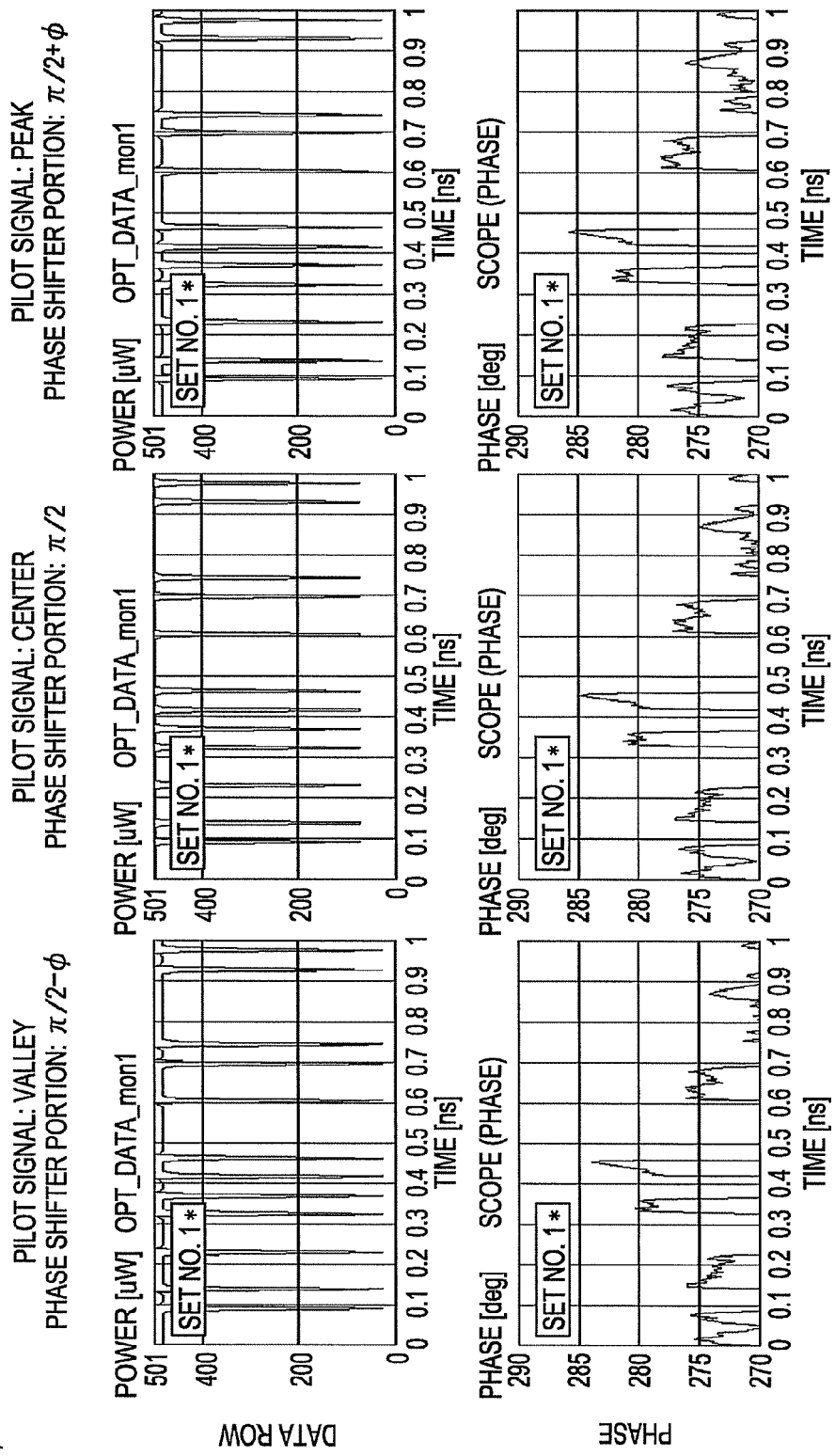
FIG. 2 is a view exemplifying a case in which respective waveforms of data rows and phase differences between propagated lights on a side of an arm A are correlated to variations in an amplitude of a pilot signal.

FIG. 2 is one example in which respective waveforms of data rows of propagated lights (light portions) on the side of an arm A are correlated to variations in the amplitude of the low-frequency pilot signal $V_{PILOT}$. More specifically, there are shown the respective waveforms of data rows (each shown in the upper portion) and phases (each shown in the lower portion) respectively corresponding to a valley portion (phase difference: $\pi/2 - \phi$), center position (phase difference: $\pi/2$), and peak portion (phase difference: $\pi/2 + \phi$) of the low-frequency pilot signal $V_{PILOT}$ in the case where the low-frequency pilot signal $V_{PILOT}$ has been superimposed about (a center corresponding to) an optimal point of the bias voltage $Vp_A$, $Vp_B$ being applied to the phase shifter portion 26A, 26B. The horizontal and vertical axes of the data waveform represent the time and optical signal intensity, respectively; and the horizontal and vertical axes of the phase waveform represent the time and phase, respectively.

From the respective phase waveforms shown FIG. 2, it can be seen that the phase is varied about the optimal point by the variation in the bias voltage on the side of the arm A, the variation corresponding to a variation in the amplitude of the low-frequency pilot signal $V_{PILOT}$. In this event, when there occurs a shift from the optimal point corresponding to the valley portion and the peak portion of the low-frequency pilot signal $V_{PILOT}$, also the waveform on the ON side varies. More specifically, a variation in an inter-bit intensity is caused by an occurrence of a $\pm\Phi$ phase shift (or, out-of-phase).

Figure 3:
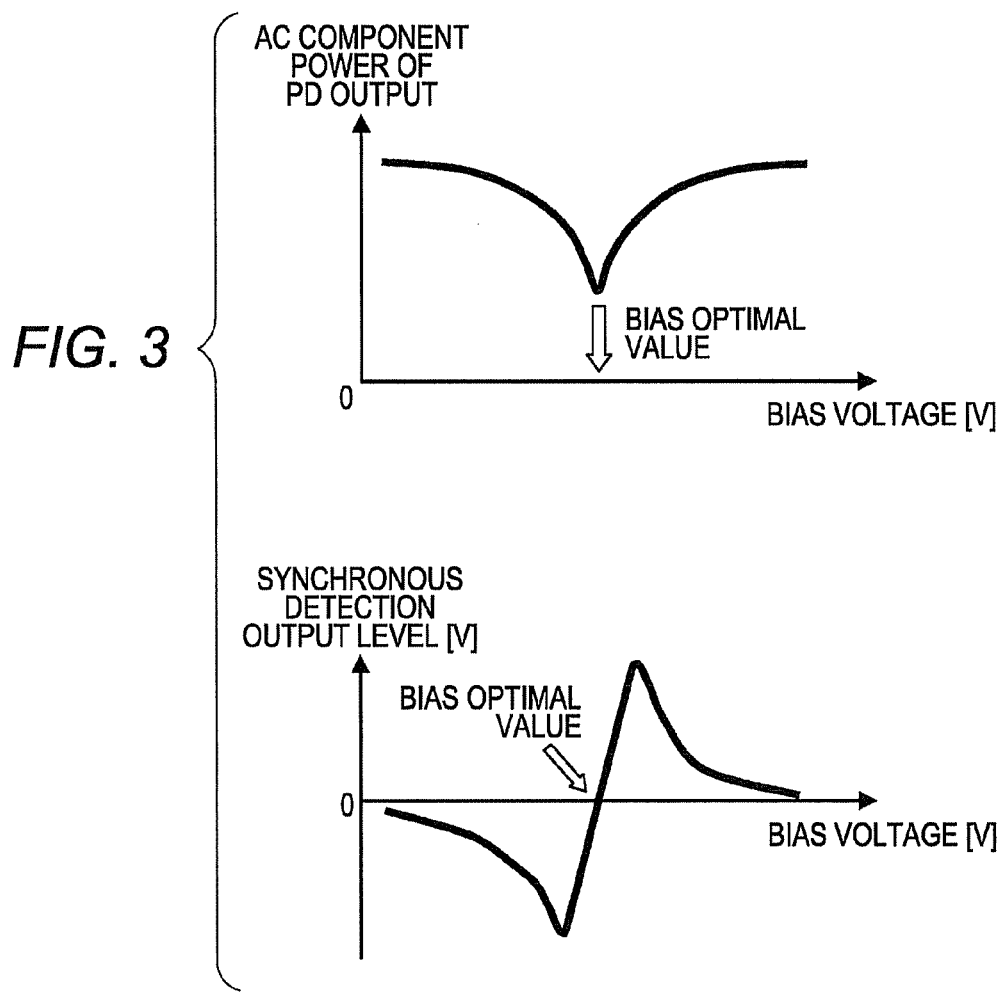
FIG. 3 is a view exemplifying a relationship of power of an AC component of a monitor signal and a level of an output signal of a synchronous detection with a bias voltage of a phase shift.

An upper view of FIG. 3 shows one example of variation in the AC component power of the monitor signal, which is output from the photodetector 27, in relation to the variation in the bias voltage $Vp_A$, $Vp_B$ being applied to the phase shifter portion 26A, 26B. As can be seen from, the AC component power of the monitor signal is minimized at the optimal point of the bias voltage $Vp_A$, $Vp_B$. Consequently, the relative phase difference of the light propagating through the respective arm A, B can be controlled to the optimal value of $\pi/2$ by performing the feedback control of the bias voltage $Vp_A$, $Vp_B$ being supplied to the phase shifter portion 26A, 26B to minimize the AC component power of the output signal of the photodetector 27. Thus, in the an embodiment, a minimum value (the value minimized as described above) of the AC component of the monitor signal can be detected with an even higher accuracy by employing the synchronous detection scheme using the low-frequency pilot signal $V_{PILOT}$. The AC component of the monitor signal can be set to a narrower band range relative to a symbol frequency of the DQPSK signal.

The lower view of FIG. 3 shows one example of variation in an output signal level of the synchronous detector 44 in relation to the variation in the bias voltage $Vp_A$, $Vp_B$ being applied to the phase shifter portion 26A, 26B. As can be seen, an output signal level of the synchronous detector 44 is set to 0 (zero) at the optimal point of the bias voltage $Vp_A$, $Vp_B$, and the polarity varies before and after that point. Consequently, the bias voltage $Vp_A$, $Vp_B$ can be controlled to be set to the optimal point by verifying a shift direction while viewing the polarity of the output signal of the synchronous detector 44. A principle of bias voltage control of a phase shifter portion such as described above is also disclosed in Japanese Patent Application No. 2005-270235, a previous application submitted by the Applicant.

In accordance with the principle described above, in the bias control portion 45, a control signal for controlling the bias voltage $Vp_A$, $Vp_B$ to the optimal point is generated corresponding to the output signal level of the synchronous detector 44. Then, the control signal is output to the bias supply portion 32. A manner similar to the above is applied to the control of the bias voltages $Vb_{A1}$ and $Vb_{A2}$ being applied to the respective bias electrodes $25_{A1}$ and $25_{A2}$ of the phase modulator portions 23A. More specifically, an output signal level of the synchronous detector 44 is optimized to near zero by controlling each of the bias voltages $Vb_{A1}$ and $Vb_{A2}$, so that also a control signal corresponding to each of the bias voltages $Vb_{A1}$ and $Vb_{A2}$ is output to the bias supply portion 32. In this case, the output level of the synchronous detection is controlled to "near zero" for the reason that the output signal of the synchronous detection does not converge to near zero depending on the case. In the manner described above, the bias voltages $Vb_{A1}$, $Vb_{A2}$ and bias voltages $Vp_A$ and $Vp_B$ being respectively applied to the respective phase modulator portions 23A and 23B and phase shifter portions 26A and 26B are feedback controlled and stabilized at the optimal points. The present embodiment has thus been presented considering that the low-frequency pilot signal $V_{PILOT}$ is superimposed on the bias voltages $Vb_{A1}$ and $Vb_{A2}$. Alternatively, however, the low-frequency pilot signal $V_{PILOT}$ may be superimposed on the bias voltages $Vb_{B1}$ and $Vb_{B2}$.

It is preferable that, in the event of a start-up of the optical transmitter or the like event, the control of the bias voltages $Vp_A$ and $Vp_B$ being supplied to the phase shifter portions 26A and 26B, and the control of the bias voltages $Vb_{A1}$ to $Vb_{B2}$ being applied to the phase modulator portions 23A and 23B be performed in a time-division manner by the bias control portion 45. This control manner is preferable so that the control on the side closer to the light source 1 is performed with priority. More specifically, in an embodiment, it is preferable that the control on the side of the phase modulator portions 23A and 23B be performed with priority to optimize the bias voltages $Vb_{A1}$ to $Vb_{B2}$, and thereafter, the control on the side of the phase shifter portions 26A and 26B be performed to optimize the bias voltages $Vp_A$ and $Vp_B$.

As described above, according to the optical transmitter of an embodiment, using the low-frequency pilot signal $V_{PILOT}$ that is superimposed only on either the bias voltages $Vb_{A1}$ and $Vb_{A2}$ being applied to the bias electrodes $25_{A1}$ and $25_{A2}$ of the phase modulator portion 23A or the bias voltages $Vb_{B1}$ and $Vb_{B2}$ being applied to the bias electrodes $25_{B1}$ and $25_{B2}$ of the phase modulator portion 23B, the bias voltage control of the phase shifter portions 26A and 26B is performed. When a bias voltage control in a phase shifter portion is performed, the low-frequency pilot signal $V_{PILOT}$ that vary the relative phase difference between the lights propagating through the respective arms A and B is superimposed on the bias voltages $Vb_{A1}$ and $Vb_{A2}$ or on the bias voltages $Vb_{B1}$ and $Vb_{B2}$. Then, the control of the bias voltages $Vp_A$ and $Vp_B$ being supplied to the phase shifter portions 26A and 26B, and the control of the bias voltages $Vb_{A1}$ to $Vb_{B2}$ being applied to the phase modulator portions 23A and 23B be performed in a time-division manner by the bias control portion 45. Thereby, the electric circuit and wiring configuration is simplified as compared to a configuration in which, as in typical or existing configurations, the low-frequency pilot signal is discretely superimposed on each of the bias voltages. Consequently, a compact and low-cost optical transmitter can be realized. Further, the DQPSK signal is monitored by use of the MMI coupler 22 and photodetector 27 of the DQPSK modulator 2, losses due to signal monitors can be suppressed, so that a transmission level of the DQPSK signal can be even more increased. Further, since the synchronous detection scheme using the low-frequency pilot signal $V_{PILOT}$ is employed, the minimum value of the AC component of the monitor signal can be detected with even higher accuracy. Consequently, even more stabilized bias voltage control can be performed.

Figure 4:
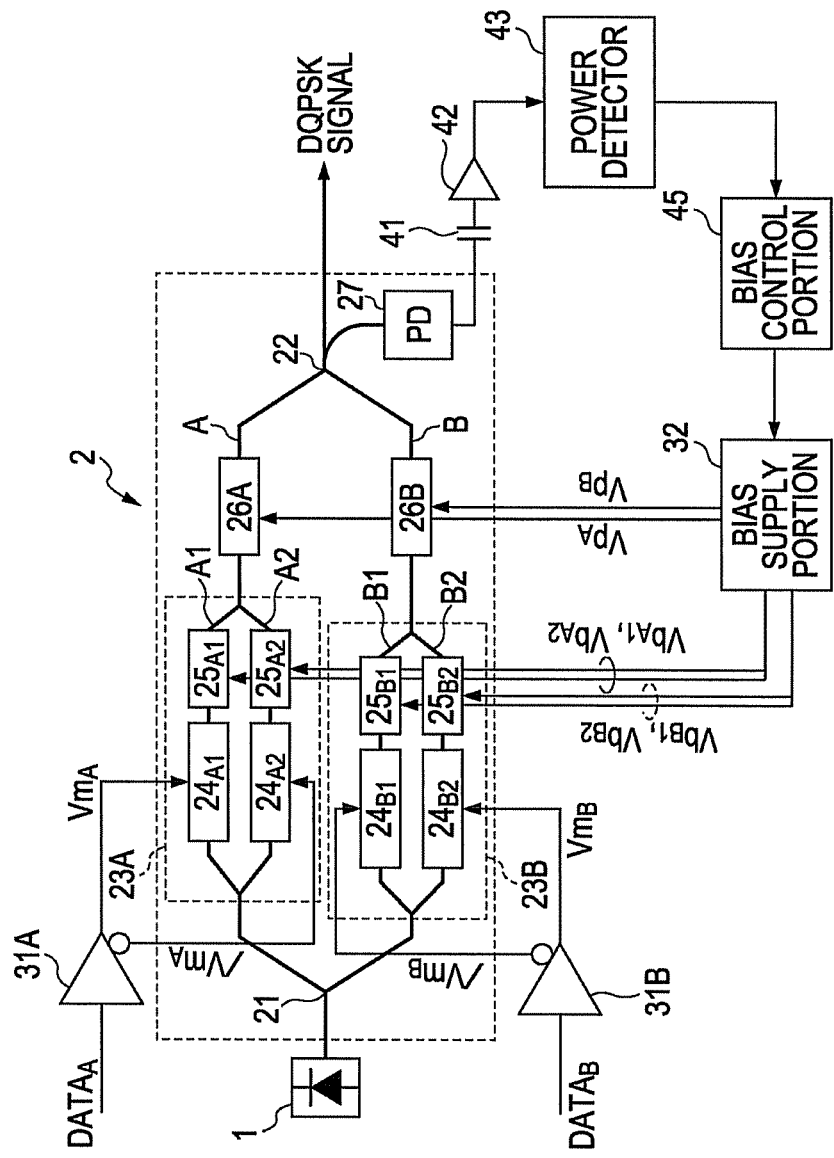
FIG. 4 is a block diagram of another example of a configuration related to an optical transmitter.

Thus, according to an embodiment, the bias voltage control is performed by employing the synchronous detection scheme. As described above, however, the bias voltage control can be performed by directly monitoring the variation in the AC component power of the output signal of the photodetector 27. An example of the configuration in this alternative case is shown in FIG. 4. According to the configuration of FIG. 4, the BPF 43' and synchronous detector 44 of FIG. 1 are omitted, and the AC component power of the monitor signal detected by the power detector 43 is transferred to the bias control portion 45. In addition, although not shown in the drawing, the configuration of FIG. 1 can be modified such that the power detector 43 is omitted, and the output of the amplifier 42 is supplied via the BPF 43' to the synchronous detector 44. Even in the modified configuration, effects and advantages similar as those of the previously discussed configuration are realized.

Figure 5:
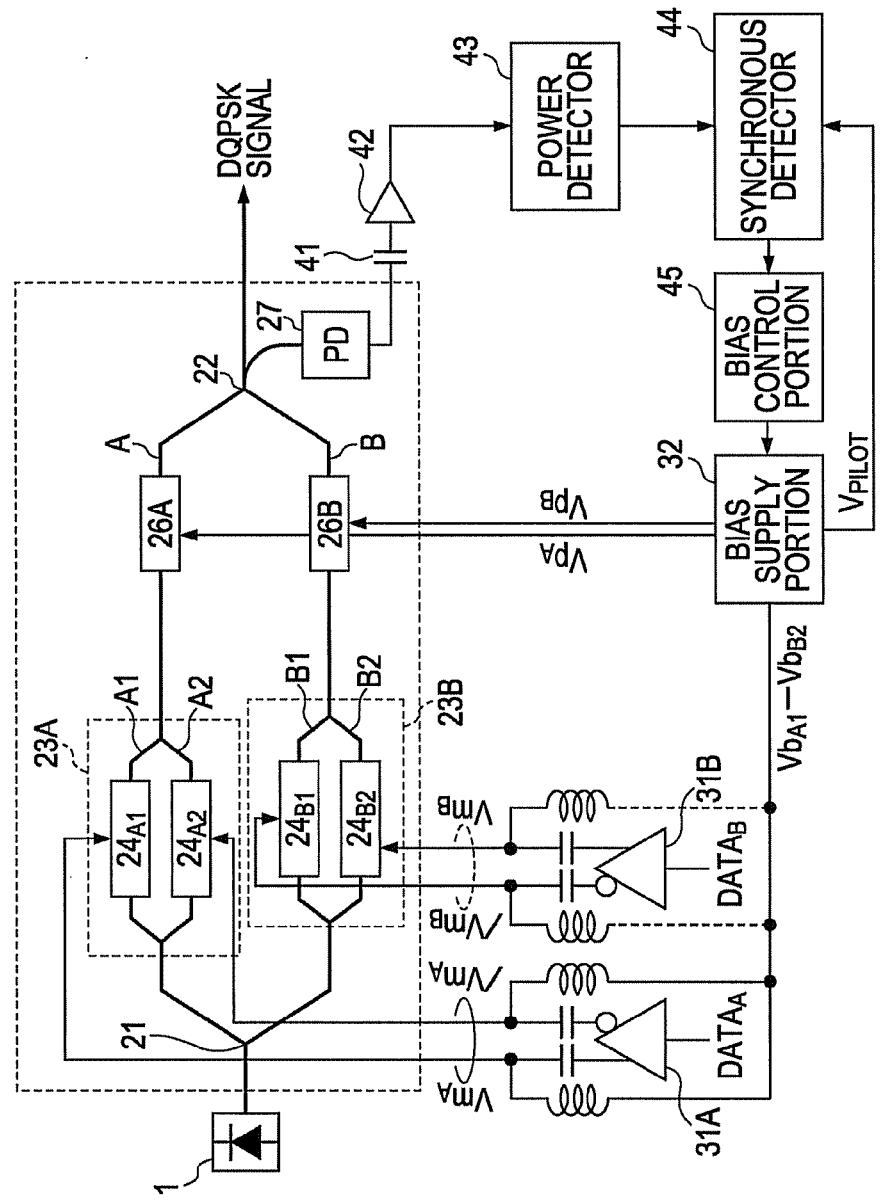
FIG. 5 is a block diagram of one example of a configuration of an optical transmitter according to an embodiment.

FIG. 5 is a block diagram of one example of a configuration of an optical transmitter according to an embodiment.

With reference to FIG. 5, in the optical transmitter, the portions related to the phase modulator portions 23A and 23B in the respective arms A and B are configured such that driving signals inclusive of the bias voltages $Vb_{A1}$ to $Vb_{B2}$ are supplied to the respective modulation electrodes $24_{A1}$ to $24_{B2}$. More specifically, suppose that a configuration in which the phase modulator portions 23A and 23B do not include the bias electrodes $25_{A1}$ to $25_{B2}$ such as shown in FIG. 1. In such a case, the low-frequency pilot signal $V_{PILOT}$ is superimposed on the driving signal $Vm_A$ and the inversion driving signal $/Vm_A$ are supplied to the respective modulation electrodes $24_{A1}$ and $24_{A2}$ in the arm A. Other configuration portions are similar to those shown in FIG. 1.

More specifically, bias-T circuits are provided to output ports of respective modulation drive portions 31A and 31B. The bias voltages $Vb_{A1}$ to $Vb_{B2}$ supplied from the bias supply portion 32 are applied via the respective bias-T circuits to the driving signals $Vm_A$ and $Vm_B$ and inversion driving signals $/Vm_A$ and $/Vm_B$. In this event, the bias voltages $Vb_{A1}$ and $Vb_{A2}$ to which the low-frequency pilot signal $V_{PILOT}$ has been superimposed are applied to the driving signal $Vm_A$ and inversion driving signal $/Vm_A$ output from the modulation drive portion 31A. Thereby, similar to FIG. 1, the DQPSK signal being output from the DQPSK modulator 2 is monitored, and synchronous detection using the low-frequency pilot signal $V_{PILOT}$ is performed. Consequently, the respective bias voltages of the phase modulator portions 23A and the phase shifter portions 26A and 26B can be feedback controlled to optimal values.

Thus, in this embodiment has been described with reference to the example in which the low-frequency pilot signal $V_{PILOT}$ is superimposed on the driving signal $Vm_A$ and inversion driving signal $/Vm_A$ on the side of the arm A. Of course, however, the configuration may be such that the low-frequency pilot signal $V_{PILOT}$ be superimposed on the driving signal $Vm_B$ and inversion driving signal $/Vm_B$. Further, the configuration may be such that the low-frequency pilot signal $V_{PILOT}$ be superimposed only on one of the driving signal $Vm_A$ and inversion driving signal $/Vm_A$.

Figure 6:
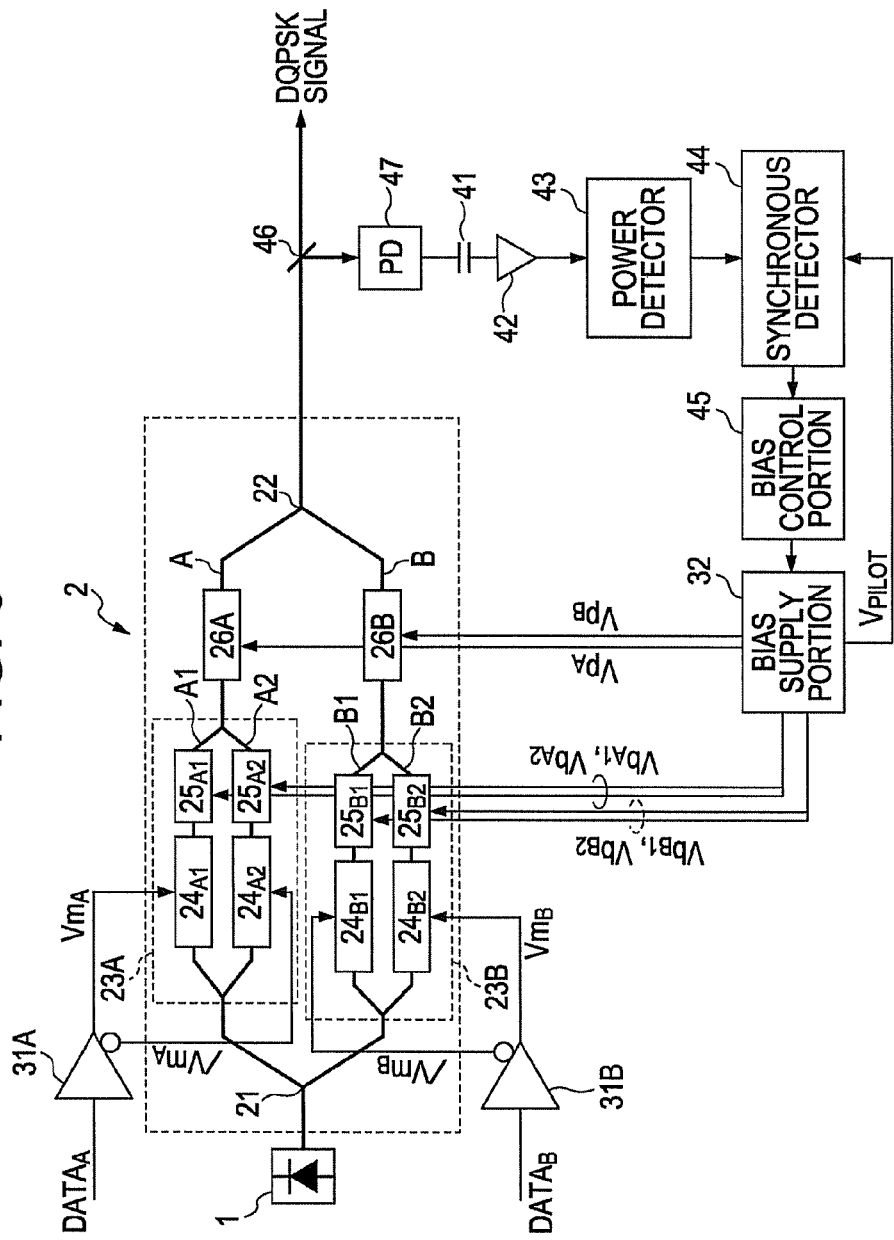
FIG. 6 is a block diagram of one example of an optical transmitter an embodiment.

FIG. 6 is a block diagram of one example of an optical transmitter according to an embodiment.

With reference to FIG. 6, the optical transmitter is configured using, for example, the configuration shown in FIG. 1. More specifically, the MMI coupler 22 and photodetector 27 in the DQPSK modulator 2 are replaced with an optical branch coupler 46 and photodetector 47 (PD) provided on the rear side of the DQPSK modulator 2 to form the configuration of monitoring the DQPSK signal. The part of the DQPSK signal output from the DQPSK modulator 2 is split as a monitor light by the optical branch coupler 46 and transferred to the photodetector 47. The monitor signal photoelectrically converted by the photodetector 47 is transferred to the synchronous detector 44 via the AC-coupling capacitor 41, the amplifier 42, and the power detector 43, similarly to the embodiment described above.

According to the optical transmitter described above, the configuration of monitoring the DQPSK signal is somewhat complex in comparison to that of the previously discussed embodiment of FIG. 1, so that a transmission level of the DQPSK signal is reduced by an insertion loss of the optical branch coupler 46. Nevertheless, however, compactness and cost reduction can be accomplished due to simplification of the electric circuits and wiring for superimposing the low-frequency pilot signal $V_{PILOT}$ on the bias voltages.

Figure 7:
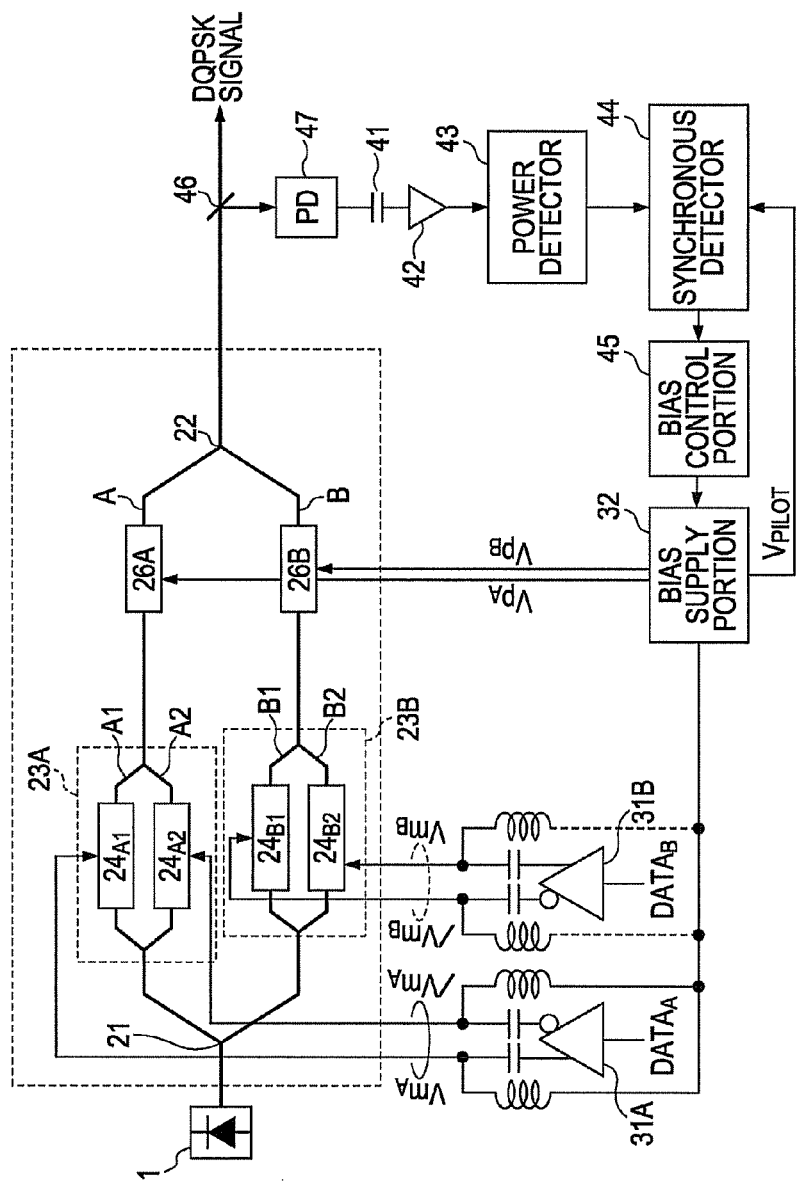
FIG. 7 is a block diagram of another example of a configuration related to an optical transmitter.

This embodiment has been described with reference to the example in which the configuration of the previously discussed embodiment (FIG. 1) is modified with respect to the signal monitor configuration. However, a configuration similar to the configuration shown in FIG. 5 may be implemented. An example of the configuration is shown in FIG. 7.

Figure 8:
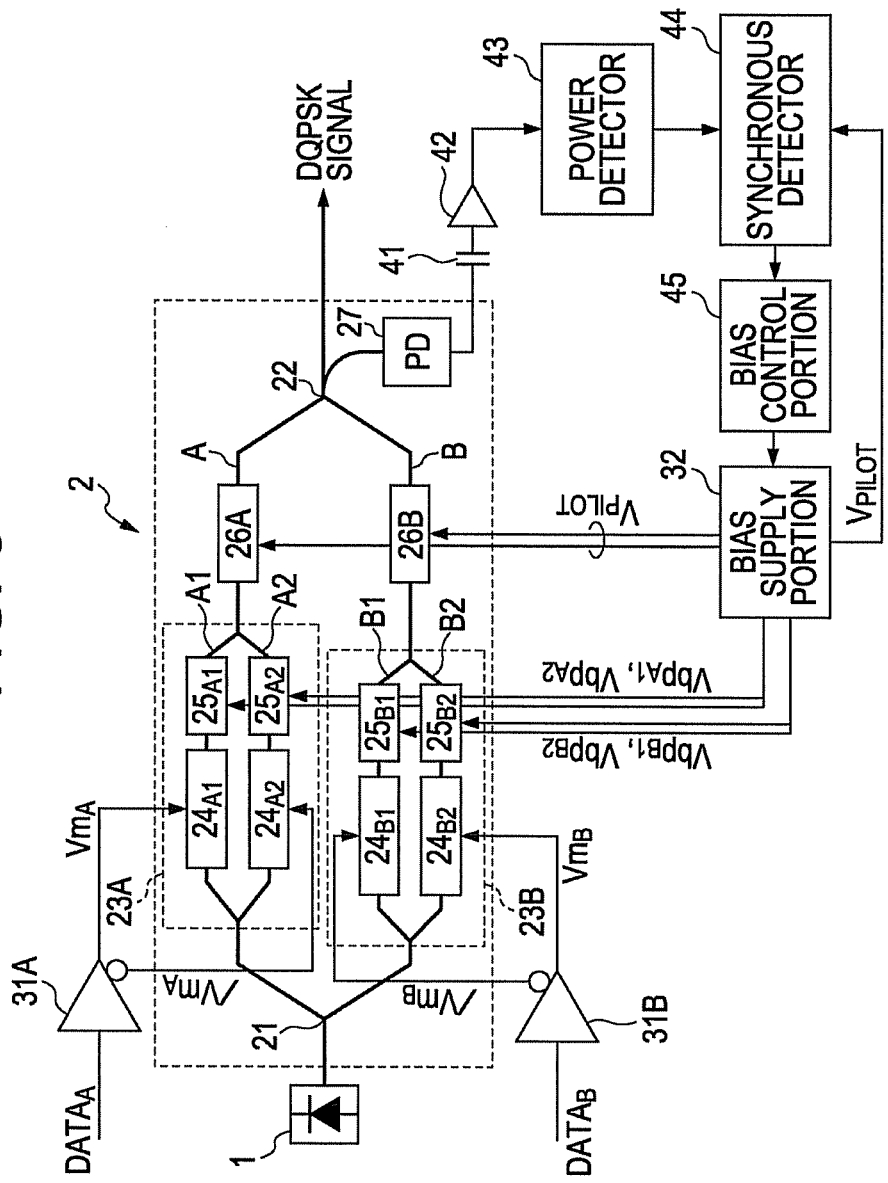
FIG. 8 is a block diagram of one example of a configuration of an optical transmitter.

FIG. 8 is a block diagram of one example of a configuration of an optical transmitter according to an embodiment.

With reference to FIG. 8, the optical transmitter is configured using, for example, the configuration shown in FIG. 1. More specifically, in this configuration, the bias voltages for imparting the π/2 relative phase difference into the lights propagating through the respective arms A and B are applied to one or both of the group of the bias electrodes $25_{A1}$ and $25_{A2}$ of the phase modulator portion 23A and the group of the bias electrodes $25_{B1}$ and $25_{B2}$ of the phase modulator portion 23B. Thereby, the low-frequency pilot signal $V_{PILOT}$ is supplied to one or both of the phase shifter portions 26A and 26B. Even in the optical transmitter of the above-described configuration, compactness and cost reduction can be accomplished due to simplification of the electric circuits and wiring for the bias supply portion.

Figure 9:
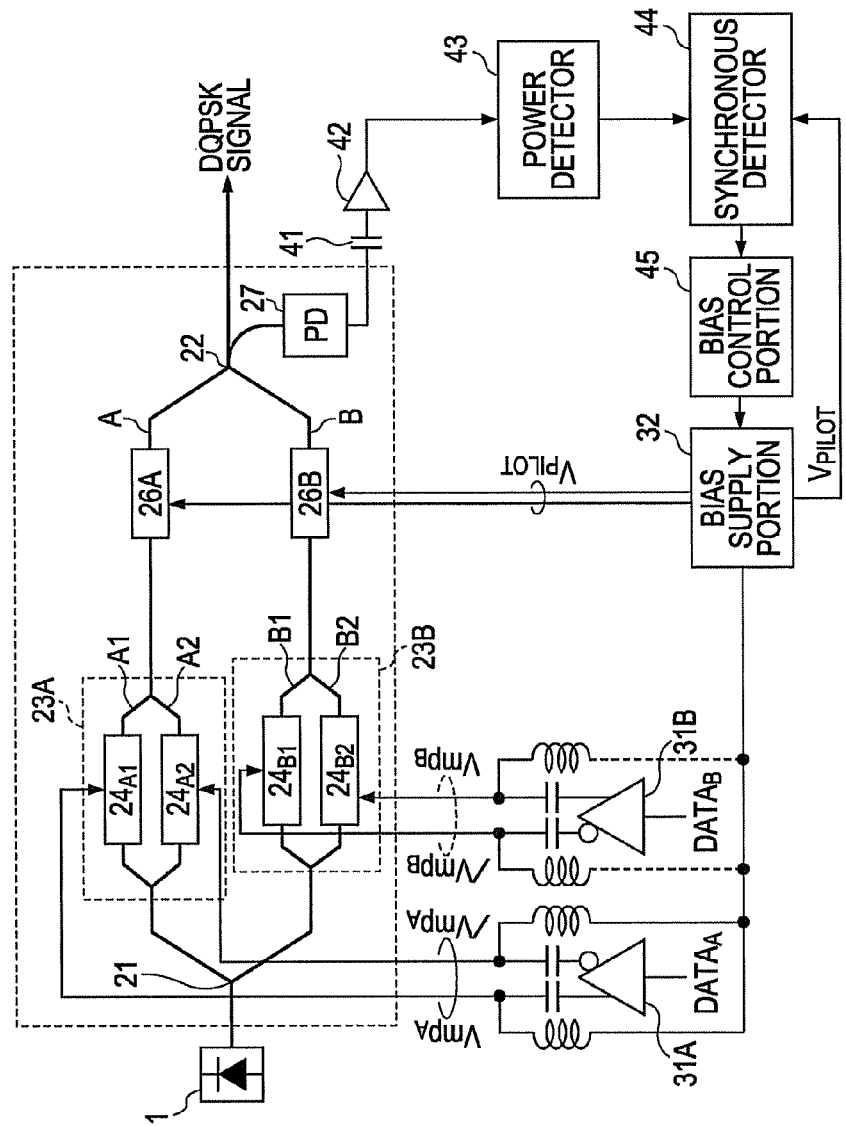
FIG. 9 is a block diagram of one example of a configuration of an optical transmitter according to an embodiment.

FIG. 9 is a block diagram of one example of a configuration of an optical transmitter according to an embodiment.

With reference to FIG. 9, the optical transmitter is configured using, for example, the configuration described above with respect to FIG. 5. More specifically, in this configuration, the bias voltages for imparting the π/2 relative phase difference into the lights propagating through the respective arms A and B are applied to one or both of the group of the modulation electrodes $24_{A1}$ and $24_{A2}$ of the phase modulator portion 23A and the group of the bias electrodes $24_{B1}$ and $24_{B2}$ of the phase modulator portion 23B. Thereby, the low-frequency pilot signal $V_{PILOT}$ is supplied to one or both of the phase shifter portions 26A and 26B. Even in the optical transmitter of the above-described configuration, effects and advantages similar to those discussed with respect to FIG. 5 can be obtained.

The respective embodiments have been described with reference to the example in which the DQPSK signal is monitored by using the MMI coupler 22 and photodetector 27 of the DQPSK modulator 2. Alternatively, however, as shown in FIGS. 6 and 7, the DQPSK signal can be monitored by using the optical branch coupler 46 and photodetector 47 provided on the rear side of the DQPSK modulator 2.

Figure 10:
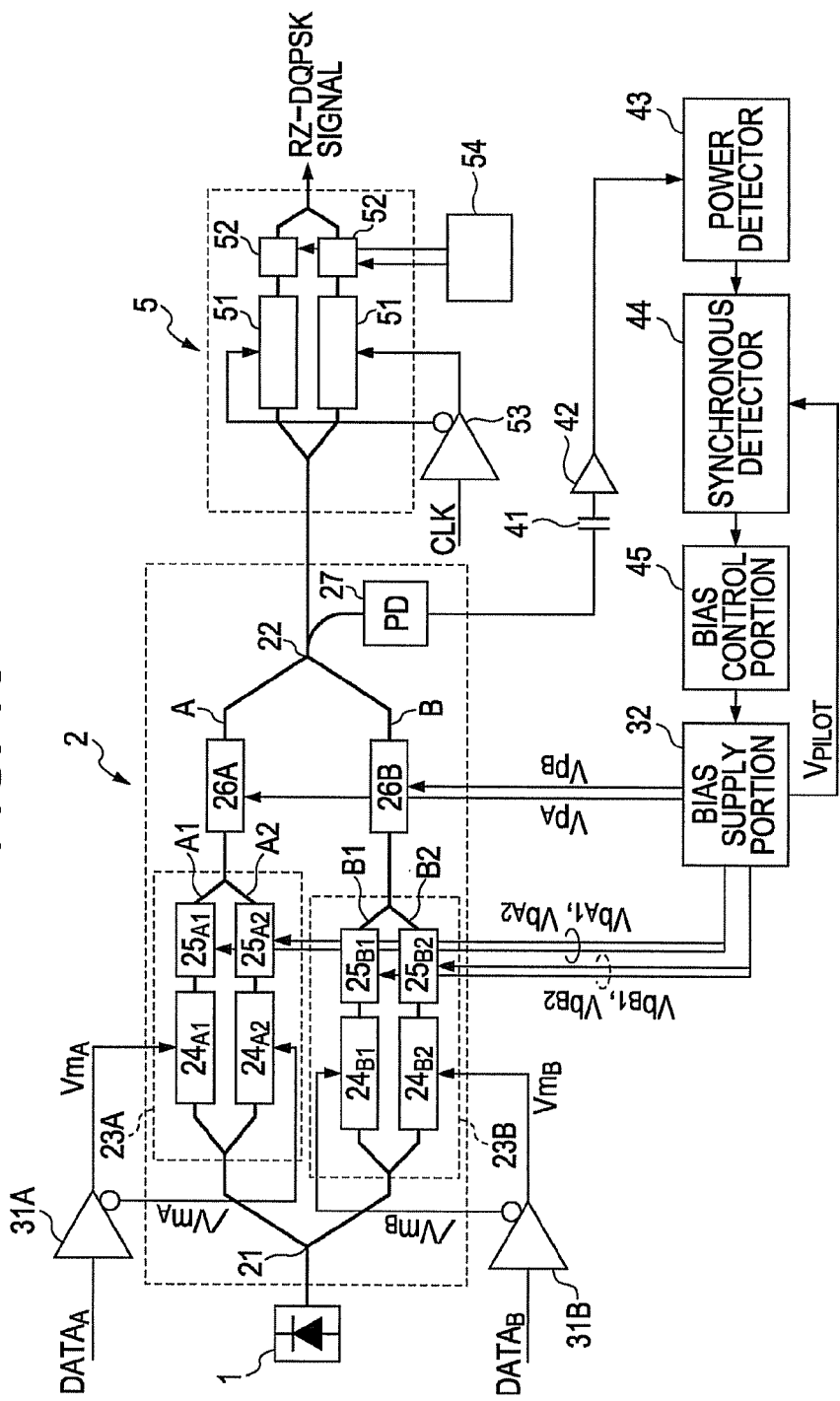
FIG. 10 is a block diagram of one example of a configuration of an optical transmitter according to an embodiment.

FIG. 10 is a block diagram of one example of a configuration of an optical transmitter according to an embodiment.

With reference to FIG. 10, the optical transmitter is configured using, for example, the configuration shown in FIG. 1. More specifically, in this embodiment, an RZ modulator portion 5 is provided on a rear side of the DQPSK modulator 2. In this configuration, the DQPSK signal output from the DQPSK modulator 2 is intensity modulated in accordance with a clock signal CLK corresponding to a symbol frequency of the data signal $DATA_A$, $DATA_B$. Thereby, an RZ-DQPSK signal is generated and transmitted.

As the RZ modulator portion 5, a general Mach-Zehnder (MZ) intensity modulator, for example, can be used. In this case, a driving signal and an inversion driving signal corresponding to the clock signal CLK output from a modulation drive portion 53 are, respectively, applied to modulation electrodes 51 in arms of an MZ interferometer. Concurrently, a bias voltage output from a bias supply portion 54 is applied to respective bias electrodes 52 of the arms. Although not shown, for compensating for operating point drift due to temperature variations or the like, the function for optimizing the bias voltages may also be provided also in the RZ modulator portion 5.

According to the optical transmitter thus configured, effects and advantages similar to those described with respect to FIG. 1 can be obtained even with configurations employing the RZ-DQPSK scheme.

Figure 11:
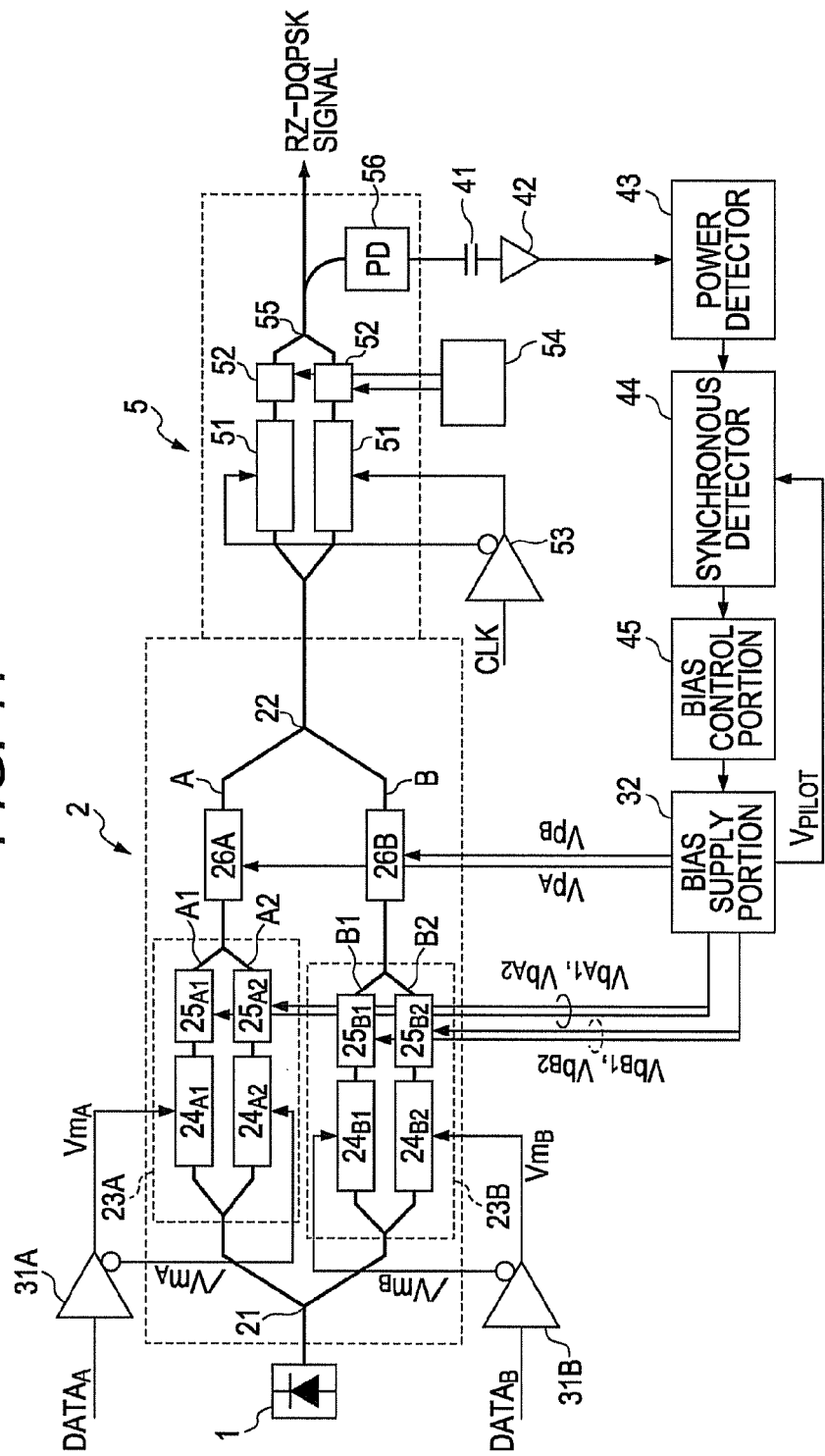
FIG. 11 is a block diagram of another example of a configuration related to an optical transmitter.

Thus, the embodiment with respect to FIG. 10 has been described with reference to the one example in which the signal is monitored using the MMI coupler 22 and photodetector 27 of the DQPSK modulator 2. Alternatively, however, as shown in FIG. 11, the signal can be monitored by use of an MMI coupler 55 and photodetector 56 of the RZ modulator portion 5. In addition, a monitor signal into the photodetector 56 may be either an in-phase signal or a reverse phase signal. The configuration thus formed is effective for compactness of, for example, a base board when the base board is commonly used to integrate together the DQPSK modulator 2 and the RZ modulator portion 5.

Figure 12:
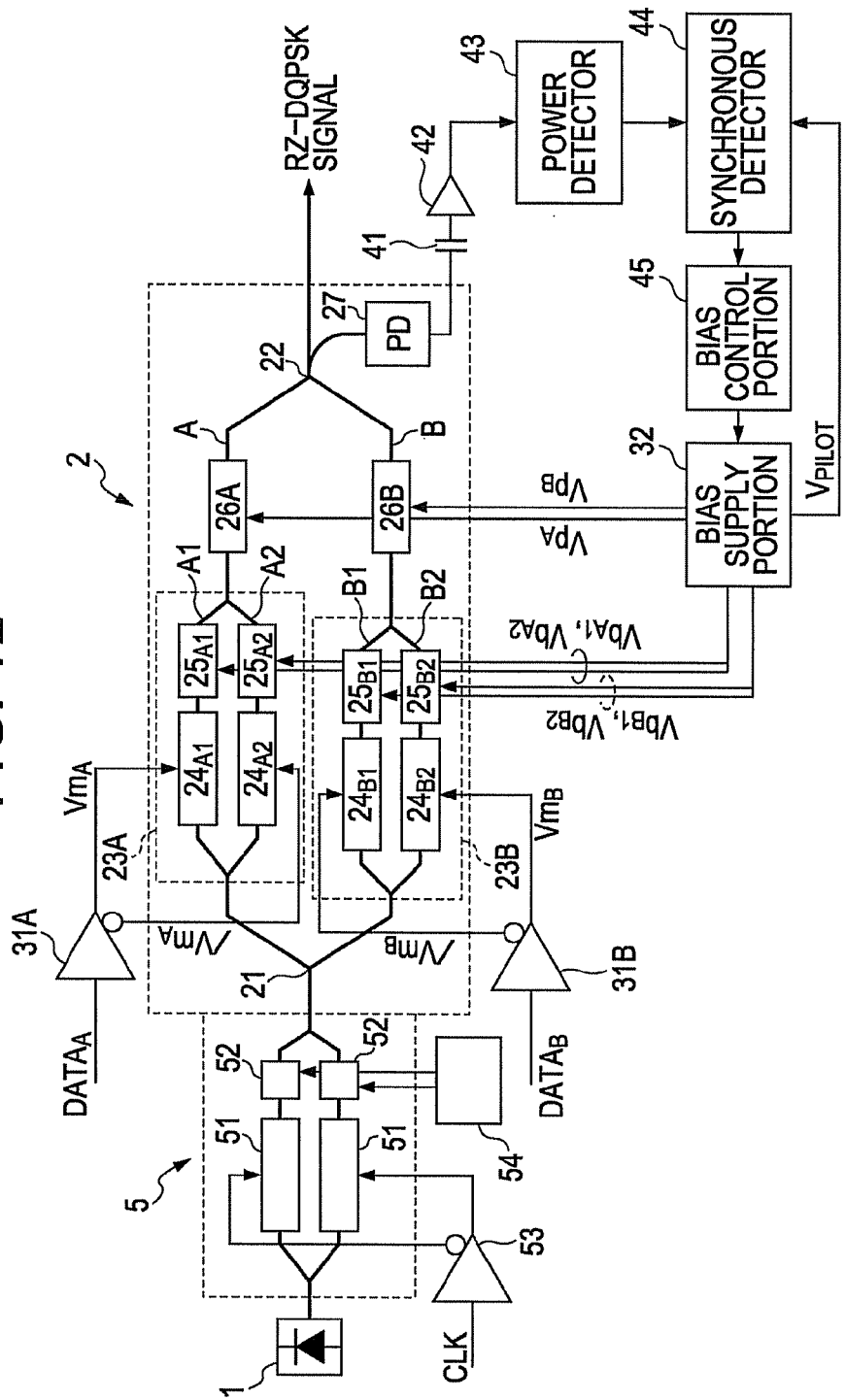
FIG. 12 is a block diagram of another example of a configuration related to an optical transmitter.

Further, while, according to the above-described example of FIG. 10, the RZ modulator portion 5 is disposed on the rear side of the DQPSK modulator 2, the RZ modulator portion 5 may be provided between the light source 1 and the DQPSK modulator 2, for example, as shown in FIG. 12. While it has been described that the RZ modulator portion is provided in the respective configuration formed based on the configuration illustrated in FIG. 1, the RZ modulator portion can be similarly provide in configurations of other embodiments.

Figure 13:
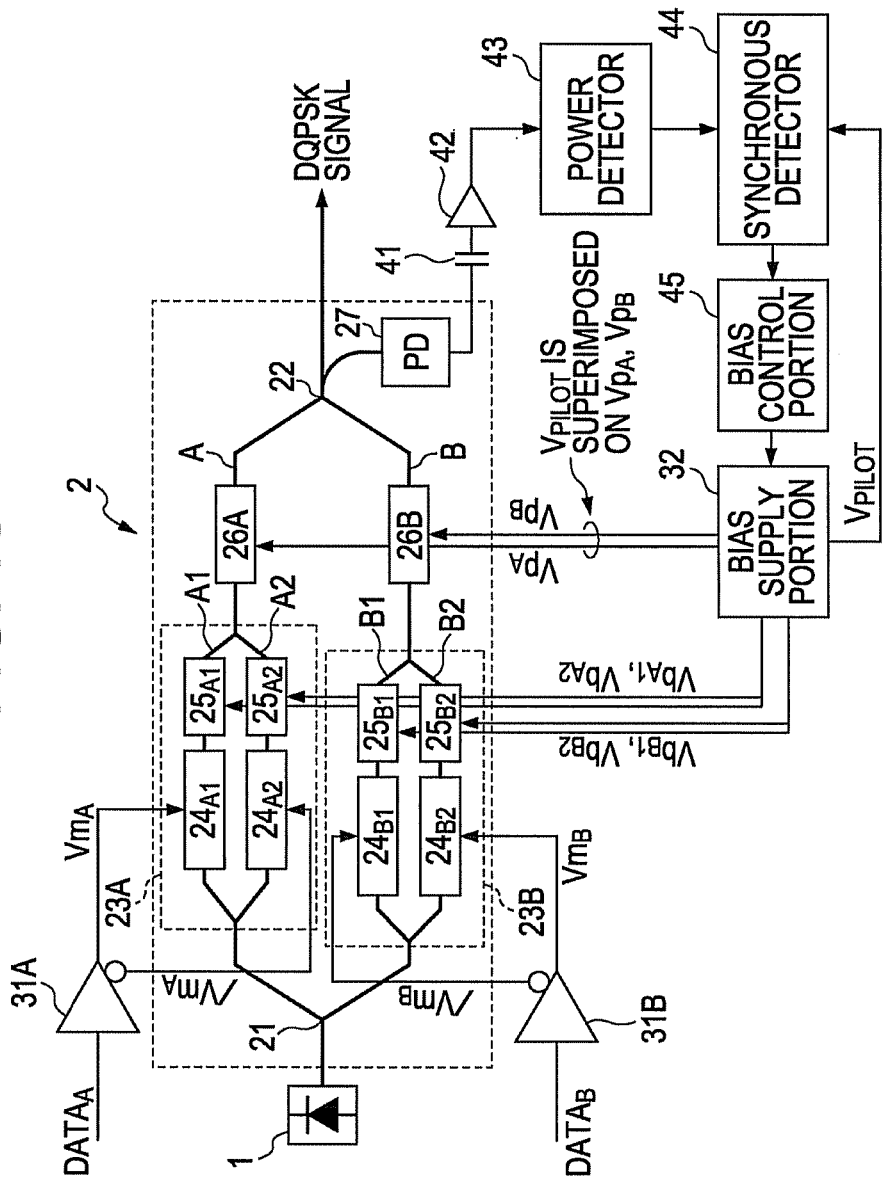
FIG. 13 is a block diagram of one example of a configuration of an optical transmitter according to an embodiment.

FIG. 13 is a block diagram of one example of a configuration of an optical transmitter according to an embodiment.

With reference to FIG. 13, the optical transmitter is one modified example of the embodiment shown in FIG. 1. In the embodiment described with respect to FIG. 1, the low-frequency pilot signal $V_{PILOT}$ is superimposed on the bias voltages $Vb_{A1}$ to $Vb_{A2}$ being supplied to the phase modulator portion 23A. In the embodiment, described with respect to FIG. 13 however, the low-frequency pilot signal $V_{PILOT}$ is instead superimposed on the bias voltages $Vp_A$ and $Vp_B$ being supplied to the respective phase shifter portions 26A and 26B. In the present example of the configuration, the low-frequency pilot signal $V_{PILOT}$ is superimposed on both the bias voltages $Vp_A$ and $Vp_B$. However, the configuration may be such that the low-frequency pilot signal $V_{PILOT}$ is applied to any one of the bias voltages $Vp_A$ and $Vp_B$.

In the optical transmitter described above, the control itself of the bias voltages being supplied to the phase shifter portions 26A and 26B is basically similar to the typical control. However, in the embodiment example described above, the MMI coupler 22 of the DQPSK modulator 2 is utilized, and the photodetector 27 built-in in the DQPSK modulator 2 is used, thereby to monitor the DQPSK signal. With this configuration, losses due to signal monitors can be suppressed, so that the transmission level of the DQPSK signal can be even more increased. In the present example case, one of the signals output from the MMI coupler 22 is monitored, whereby a reverse phase signal relative to a signal split from a primary signal side is monitored. In addition, a monitor signal into the photodetector 27 may be either an in-phase signal or a reverse phase signal.

Figure 14:
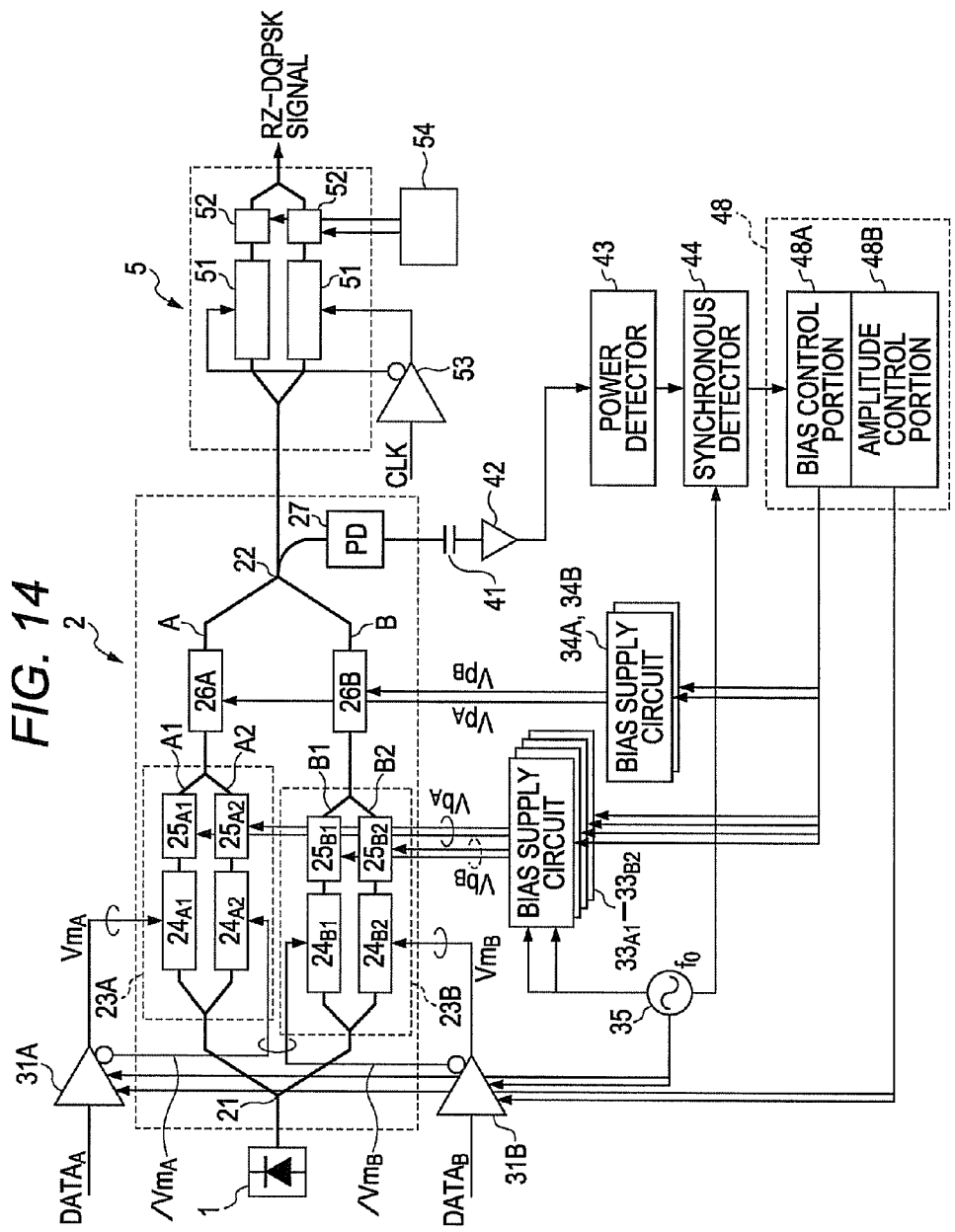
FIG. 14 is a block diagram of one example of a configuration of an optical transmitter according to an embodiment.

FIG. 14 is a block diagram of one example of a configuration of an optical transmitter according to an embodiment.

With reference to FIG. 14, the optical transmitter is a further practical application example of the embodiment shown in FIG. 10. The embodiment illustrated in FIG. 14 employs a configuration corresponding to not only the bias voltage control of the phase modulator portions 23A and 23B and the phase shifter portions 26A and 26B, but also drive amplitude control of the phase modulator portions 23A and 23B.

More specifically, in the optical transmitter, a pilot signal $V_{PILOT}$ of a frequency $f_0$ output from an oscillator 35 is transferred to bias supply circuits $33_{A1}$ to $33_{B2}$ that supply the bias voltages $Vb_{A1}$ to $Vb_{B2}$ to the respective bias electrodes $25_{A1}$ to $25_{B2}$ of the phase modulator portion 23A and 23B. The pilot signal $V_{PILOT}$ is further transferred to the modulation drive portions 31A and 31B that supply the driving signals $Vm_A$ and $Vm_B$ and inversion driving signals $/Vm_A$ and $/Vm_B$ to the respective modulation electrodes $24_{A1}$ to $24_{B2}$ of the phase modulator portions 23A and 23B and to the synchronous detector 44. Thereby, the bias voltages $Vb_{A1}$ and $Vb_{A2}$ on which the pilot signal $V_{PILOT}$ of the frequency $f_0$ has been superimposed are applied to the respective bias electrodes $25_{A1}$ and $25_{A2}$. Concurrently, the driving signals $Vm_A$ and $Vm_B$ to which the pilot signal $V_{PILOT}$ of the frequency $f_0$ has been superimposed and the inversion driving signals $/Vm_A$ and $/Vm_B$ are applied to the respective modulation electrodes $24_{A1}$ to $24_{B2}$. Then, a pilot signal $V_{PILOT}$ of a frequency $f_0$ may be output from a control circuit 48 without using oscillator.

Similarly as in the embodiment of FIG. 1 or the like, the signal output from the DQPSK modulator 2 is monitored by use of the MMI coupler 22 and the photodetector 27. The monitored signal is transferred via the capacitor 41, the amplifier 42, and the power detector 43 to the synchronous detector 44, whereby the synchronous detection using the pilot signal $V_{PILOT}$ is performed. The result of the synchronous detection performed by the synchronous detector 44 is transferred to a control circuit 48 that includes a bias control portion 48A and an amplitude control portion 48B. Then, in accordance with a result of the synchronous detection, feedback control is performed by the bias control portion 48A for the bias voltages $Vp_A$ and $Vp_B$ being supplied to the respective phase shifter portions 26A and 26B and the bias voltages $Vp_{A1}$ and $Vp_{B2}$ being applied to the bias electrodes $25_{A1}$ to $25_{B2}$ of the respective phase modulator portions 23A and 23B. Concurrently, feedback control is performed by the amplitude control portion 48B for the respective amplitudes of the driving signals $Vm_A$ and $Vm_B$ being applied to the modulation electrodes $24_{A1}$ to $24_{B2}$ of the respective phase modulator portions 23A and 23B and the respective amplitudes of the inversion driving signals $/Vm_A$ and $/Vm_B$.

Then, the bias voltage control of the phase shifter portions 26A and 26B, and the drive amplitude control and bias voltage control of the phase modulator portions 23A and 23B be performed in a time-division manner by the bias control portion 48, only using a low-frequency pilot signal $V_{PILOT}$.

Further, the DQPSK signal output from the DQPSK modulator 2 is RZ pulsed by the RZ modulator portion 5 in accordance with the clock signal CLK. Thereby, an RZ-DQPSK signal is generated and transmitted to the outside.

According to the optical transmitter described above, the bias voltage control and drive amplitude control by the DQPSK modulator 2 can be accomplished by the simplified configuration. Further, the compact and low-cost optical transmitter capable of stably transmitting the RZ-DQPSK signal can be realized.

Figure 15:
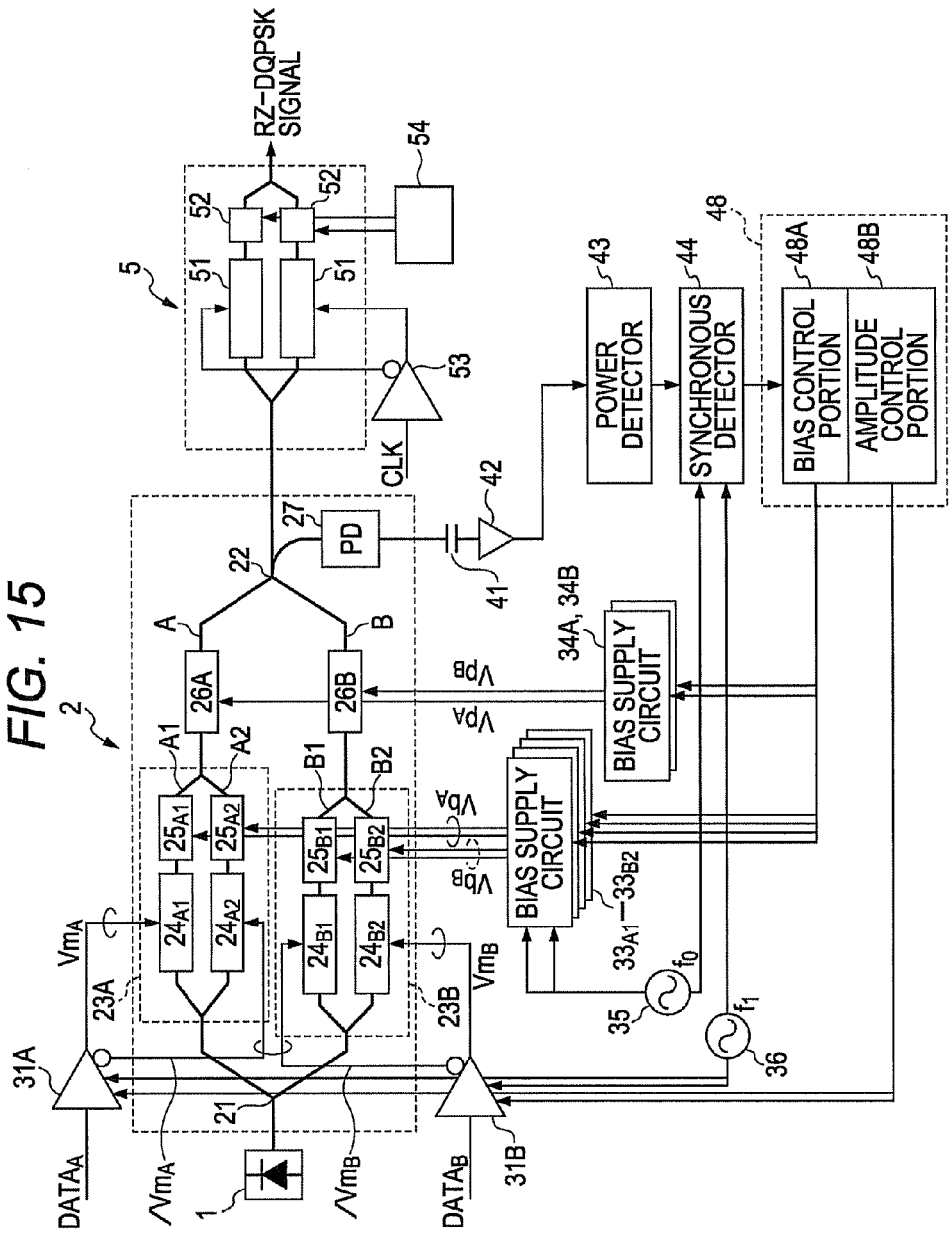
FIG. 15 is a block diagram of one example of a configuration of an optical transmitter according to an embodiment.

FIG. 15 is a block diagram of one example of a configuration of an optical transmitter according to an embodiment.

With reference to FIG. 15, the optical transmitter is an application example of the embodiment shown in FIG. 14. More specifically, in the optical transmitter of FIG. 15, the frequency of the pilot signal $V_{PILOT}$ used for the bias voltage control of the phase modulator portions 23A and 23B and the phase shifter portions 26A and 26B is different from the frequency of the pilot signal $V_{PILOT}$ used for the drive amplitude control of the phase shifter portions 26A and 26B.

More specifically, the low-frequency pilot signal $V_{PILOT}$ of the frequency $f_0$ output from an oscillator 35 is transferred to the bias supply circuits $33_{A1}$ and $33_{A2}$ that supply the bias voltages $Vb_{A1}$ and $Vb_{A2}$ to the respective bias electrodes $25_{A1}$ and $25_{A2}$ of the phase modulator portion 23A and to the synchronous detector 44. Concurrently, a pilot signal $V_{PILOT}'$ of a frequency $f_1$ ($\neq f_0$) output from an oscillator 36 is transferred to the modulation drive portions 31A and 31B that supply the driving signals $Vm_A$ and $Vm_B$ and the inversion driving signals $/Vm_A$ and $/Vm_B$ to the modulation electrodes $24_{A1}$ to $24_{B2}$ of the phase modulator portions 23A and 23B and to the synchronous detector 44. Thereby, the bias voltages $Vb_{A1}$ and $Vb_{A2}$ on which the pilot signal $V_{PILOT}$ of the frequency $f_0$ has been superimposed are applied to the respective bias electrodes $25_{A1}$ and $25_{A2}$. Concurrently, the driving signals $Vm_A$ and $Vm_B$ on which the pilot signal $V_{PILOT}'$ of the frequency $f_1$ has been superimposed and the inversion driving signals $/Vm_A$ and $/Vm_B$ are applied to the respective modulation electrodes $24_{A1}$ to $24_{B2}$.

Thus, according to the configuration described above, the pilot signals $V_{PILOT}$ and $V_{PILOT}'$ different in frequency from each other are used. With this configuration, the bias voltage control of the phase modulator portions 23A and 23B, the phase shifter portions 26A and 26B and the drive amplitude control of the phase modulator portions 23A and 23B can be performed independent of each other. Consequently, the bias voltage control and drive amplitude control of the phase modulator portions 23A and 23B can be performed in parallel, thereby enabling the control speeds to be improved. Additionally, by applying a pilot signal $V_{PILOT}''$ of a frequency $f_2$ ($\neq f_0, \neq f_1$) and a pilot signal $V_{PILOT}$ of a frequency $f_0$ to control the phase modulator portions 23A and 23B each, the bias voltage control of the phase modulator portions 23A and 23B can be performed in parallel, thereby enabling the control speeds to be further improved. Then, the pilot signals may be output from a control circuit 48 without using oscillators.

Thus, respective embodiments have been described with reference to practical examples of the configuration of the embodiment shown in FIG. 10. However, similar practical examples can be enforced also for the configurations shown in FIGS. 11 and 12. Further, the combination with the drive amplitude control in the phase modulator portion can be adapted as well to the respective embodiments.

Further, respective embodiment have been described and shown with reference to the example optical transmitters corresponding to either the DQPSK modulation or DQPSK modulation scheme. However, the modulation scheme adaptable to the present invention is not limited to any one of the schemes of the examples described above, and the present invention is effective for various optical transmitters corresponding to multiphase modulation schemes.

In the optical transmitter having the configuration described in the specification, the light from the light source is split by the splitter portion, and the split lights are then transferred to the plurality of optical paths. Then, the light propagating through the respective optical path is phase modulated by the phase modulator portion in accordance with the data signal, and a predetermined phase difference is imparted by the phase shifter portion to the respective light portion(s). Then, the lights having been output from the respective optical paths are coupled together by the coupler portion, thereby to generate a multiphase modulated signal. In this event, since a low-frequency pilot signal is superimposed on one of the bias voltages being supplied to the side of the phase modulator parts and phase shifter part, when an offset occurs in the phase difference being imparted into the light propagating through the respective optical path, a variation occurs in the power of the light that will be output from the coupler portion. Accordingly, the variation is monitored by the monitor portion, and feedback control of the bias voltages on the side of the phase modulator portions and the side of phase shifter portions are performed in accordance with the result of monitoring. Thereby, the respective bias voltage can be stabilized at an optimal value.

Although a few embodiments have been shown and described, it would be appreciated by those skilled in the art that changes may be made in these embodiments without departing from the principles and spirit of the invention, the scope of which is defined in the claims and their equivalents.

What is claimed is:

1. An optical transmitter for generating and transmitting a multiphase modulated signal, comprising:
   a light source that generates an optical light;
   a splitter that splits the light received from the light source into a plurality of lights;
   a plurality of optical paths that each input a respective light split by the splitter;
   a plurality of phase modulators that each perform phase modulation of a respective light propagating through a corresponding optical path in accordance with a data signal;
   a first bias supply driver that supplies bias voltages for regulating an operating point of each of the plurality of phase modulators;
   phase shifters that each impart a predetermined phase difference into the respective light propagating through the corresponding optical paths;
   a second bias supply driver that supplies bias voltages for phase difference regulation to a side of the phase shifters;
   a coupler that couples lights output from the corresponding optical paths;
   a monitor that monitors an output of the coupler; and
   a bias controller that performs a feedback control of one of more of the first bias supply driver and the second bias supply driver based on said monitoring, where the feedback control corresponds to an output level detected in relation to variation in the bias voltages and an amount of a phase shift imparted from the phase shifters to the lights propagating through the corresponding optical paths is regulated to correspond to the bias voltages for stabilization at an optimal value, and
   wherein one of the first and second bias supply drivers superimposes a pilot signal on either one of bias voltages being supplied to a side of at least one of the plurality of phase modulators and to the side the phase shifters, the pilot signal having a frequency lower than a frequency of a bit rate of the data signal.

2. An optical transmitter according to claim 1, wherein the monitor performs a synchronous detection using the pilot signal in accordance with the output of the coupler, and
   the bias controller performs the feedback control of the first bias supply driver and the second bias supply driver so that an output signal level of the synchronous detection in the monitor becomes near zero.

3. An optical transmitter according to claim 1, wherein the monitor monitors a power of an AC (alternating current) component of the output of the coupler, and
   the bias controller performs the feedback control of the first bias supply driver and the second bias supply driver so that a power to be monitored in the monitor is minimized.

4. An optical transmitter according to claim 1, wherein the coupler includes an optical coupler that includes a plurality of input ports corresponding to the plurality of optical paths and two output ports and that utilizes a multi-mode interference, and
   the monitor monitors an output of one of the two output ports of the optical coupler utilizing the multi-mode interference.

5. An optical transmitter according to claim 1, wherein the monitor includes an optical branch coupler provided in an optical path connecting with an output end of the coupler, and monitors a signal split by the optical branch coupler.

6. An optical transmitter according to claim 1, wherein the phase shifters vary phases of the corresponding lights propagating through the plurality of optical paths to thereby impart a predetermined phase difference into the lights,
   the second bias supply driver supplies a plurality of bias voltages respectively corresponding to the plurality of optical paths to the side of the phase shifters, and
   when superimposing the pilot signal on the plurality of bias voltages on the side of the phase shifters, one of the first and second bias supply drivers superimposes the pilot signal on at least one of the plurality of bias voltages being supplied to the phase shifters.

7. An optical transmitter according to claim 1, wherein the monitor has a narrower band range in comparison to a symbol frequency of the signal.

8. An optical transmitter according to claim 1, further comprising:
   an intensity modulator that performs intensity modulation of the signal output from the coupler, in accordance with a clock signal of a frequency corresponding to the bit rate of the data signal.

9. An optical transmitter according to claim 8, wherein the monitor monitors an output of the intensity modulator.

10. An optical transmitter according to claim 1, further comprising:

an intensity modulator that performs intensity modulation of the light from the light source, in accordance with a clock signal of a frequency corresponding to the bit rate of the data signal.

11. An optical transmitter according to claim 1, wherein one of the first and second bias supply drivers that superimposes the pilot signal on driving signals corresponding to respective data signals being supplied to the plurality of phase modulators, and the optical transmitter further comprises an amplitude controller that performs a feedback control of an amplitude of the driving signal in accordance with a result of monitoring performed by the monitor.

12. An optical transmitter according to claim 11, wherein one of the first and second bias supply drivers superimposes a pilot signal on a driving signal, where the pilot signal is different in frequency from the pilot signal that is superimposed on the one of the bias voltages.

13. An optical transmitter for generating and transmitting a multiphase modulated signal, comprising:

a light source that generates an optical light;

a splitter that splits the light received from the light source into a plurality of lights;

a plurality of optical paths that each inputs a respective light split by the splitter;

a plurality of phase modulators that each perform phase modulation of a respective light propagating through a corresponding optical path in accordance with a data signal;

a first bias supply driver that supplies bias voltages for regulating an operating point of each of the plurality of phase modulators;

phase shifters that each impart a predetermined phase difference into the respective light propagating through corresponding optical paths;

a second bias supply driver that supplies bias voltages for phase variation to a side of the phase shifters;

a coupler that couples the lights output from the corresponding optical paths, the coupler including an optical coupler that includes a plurality of input ports corresponding to the plurality of optical paths and two output ports and utilizes a multi-mode interference;

a monitor that monitors an output of one of the two output ports of the optical coupler utilizing the multi-mode interference;

a bias controller that performs a feedback control of at least the second bias supply driver in accordance with a result of monitoring performed by the monitor, and wherein the second bias supply driver superimposes a pilot signal on bias voltages being supplied to at least the side of the phase shifters, the pilot signal having a frequency lower than a frequency of a bit rate of the data signal.

* * * * *